United States Patent [19]

Illig

[11] 4,072,490
[45] Feb. 7, 1978

[54] APPARATUS AND PROCESS FOR PRODUCING A GRADIENT PHOTOCHROMIC OPHTHALMIC LENS

[75] Inventor: Edwin J. Illig, Corning, N.Y.

[73] Assignee: Corning Glass Works, Corning, N.Y.

[21] Appl. No.: 739,604

[22] Filed: Nov. 8, 1976

[51] Int. Cl.² .............................................. C03B 32/00
[52] U.S. Cl. ..................................... 65/30 R; 65/103; 65/111; 65/269; 65/288
[58] Field of Search ..................... 65/DIG. 2, 30, 111, 65/115, 269, 288; 350/195, 205

[56] References Cited

U.S. PATENT DOCUMENTS 3,250,246  5/1966  Stilley et al. ........................ 65/288 X

FOREIGN PATENT DOCUMENTS 877,242  9/1961  United Kingdom ................... 65/103

*Primary Examiner*—Arthur D. Kellogg
*Attorney, Agent, or Firm*—Kees van der Sterre; Clinton S. Janes, Jr.; Clarence R. Patty, Jr.

[57] ABSTRACT

A gradient photochromic ophthalmic lens blank is produced by heat treating an ophthalmic lens blank composed of potentially photochromic glass at a temperature sufficient to develop photochromic properties therein, while maintaining in proximity to a portion of the lens blank a metal heat sink with a specified heat absorbing capacity. The metal heat sink acts to provide a temperature gradient across the ophthalmic lens blank during heating, which gradient is effective to provide a gradient in photochromic properties thereacross.

4 Claims, 4 Drawing Figures

APPARATUS AND PROCESS FOR PRODUCING A GRADIENT PHOTOCHROMIC OPHTHALMIC LENS

BACKGROUND OF THE INVENTION

A gradient photochromic glass article is a glass article exhibiting a gradient in photochromic properties thereacross. One example is a photochromic glass article having a first region exhibiting photochromic properties normal for a photochromic glass and a second region exhibiting photochromic properties which are at least substantially less developed than those of the first lens portion. Often the second portion is non-photochromic. The transition from the strongly photochromic to the weakly photochromic or non-photochromic region may be gradual or abrupt.

A number of methods for producing gradient photochromic glasses are known. Canadian Pat. No. 739,404, for example, describes a method wherein potentially photochromic glass is heat treated in a partitioned lehr having a high temperature zone and a low temperature zone. Alternately, the glass is partly encased in a refractory block during heating. Such heat treatments establish a temperature gradient across the glass which is effective to provide a gradient in photochromic properties thereacross. Thus potentially photochromic glass in the high temperature zone of the lehr reaches a temperature sufficient to develop photochromism therein while the glass in the low temperature zone does not.

A related method for producing gradient photochromic glass is described in German Patentschrift 2,125,232. According to that method, a continuous sheet of potentially photochromic glass is drawn past heating means which selectively heat only part of the width of the glass sheet. The heated width develops photochromic properties whereas the remainder of the sheet width does not.

As presently proposed, neither of the foregoing two methods is suitable for the manufacture in quantity of discrete lens blanks for gradient photochromic ophthalmic lenses. The former method involves a special lehr and/or individual handling of each piece to be treated, whereas the latter method is useful only for the treatment of continuous sheet. Other processes for producing gradients in photochromic properties across glass articles, such as the ion-exchange method described in U.S. Pat. No. 3,419,370, are similarly unsuited for the manufacture of gradient photochromic ophthalmic lenses.

One method recently developed for the production of gradient photochromic ophthalmic lens blanks comprises subjecting potentially photochromic glass blanks to a heat treatment while maintaining part of the lens blank in proximity to a quantity of evaporable liquid contained in or supported by a porous refractory carrier material. The heat treatment is carried out at a temperature sufficient to develop photochromic properties in the potentially photochromic glass; however, vapor generated by the evaporable liquid during heat treatment maintains the part of the lens blank in proximity thereto at temperatures below that required for full photochromic development. Thus a gradient photochromic ophthalmic lens blank is provided.

Certain disadvantages arise in the production of gradient photochromic ophthalmic lens blanks by the above-described method. One major disadvantage is that porous refractory carrier materials of the kind best suited for controlled vapor release are subject to deterioration and breakage due to the adverse physical and chemical effects of repeated thermal cycling in the presence of liquid.

A very important requirement of any glass product intended for ophthalmic use is uniformity with respect to clarity, color, and photochromic response. Gradient photochromic ophthalmic lens blanks must meet a further requirement of uniformity in that the quality (relative sharpness) and position within the lens blank of the photochromic gradient must be reproducible. In the vapor process, it appears that rather minor variations in refractory carrier porosity and/or liquid absorption may produce variability in the gradient photochromic product.

It is the principal object of the present invention to provide a process for producing a gradient photochromic ophthalmic lens blank which is not subject to the above-described disadvantages.

It is a further object to provide a process which produces gradient ophthalmic lens blanks of improved uniformity with respect to gradient quality.

Other objects and advantages of the invention will become apparent from the following description and examples thereof.

SUMMARY OF THE INVENTION

In accordance with the present invention, a gradient photochromic ophthalmic lens blank is produced by subjecting an ophthalmic lens blank composed of a potentially photochromic glass to a heat treatment while maintaining a selected portion of the blank in proximity to a metal heat sink having a specified minimum heat absorbing capacity. The heat treatment is carried out at a temperature sufficient to develop photochromic properties in the potentially photochromic glass, but the selected portion of the lens blank which is in proximity to the metal heat sink is insufficiently heated and remains non-photochromic or only weakly photochromic following treatment. Thus a gradient in photochromic properties across the ophthalmic lens blank is provided.

The metal heat sink which is used must be one which has sufficient heat capacity to maintain the portion of the lens blank in proximity thereto at a reduced temperature for a time sufficient to prevent full development of photochromic phases therein. Insufficient heat capacity in the heat sink produces a photochromic gradient of inferior quality, or no gradient at all. It presently appears that a properly positioned metal heat sink of sufficient mass to provide a heat capacity of at least about 15 cal. per ° C. may usefully be employed to provide a gradient photochromic ophthalmic lens blank according to the present method.

The use of metal heat sinks is advantageous because it does not involve the special handling of lens blanks or the use of specially designed heat treating equipment. Heat treatment may be carried out using conventional lehrs or furnaces operating under normal conditions.

In accordance with the invention there is also provided apparatus for making a gradient photochromic ophthalmic lens. The apparatus comprises lens support means for supporting an ophthalmic lens blank in a horizontal position in a glass heat treating furnace or lehr, within which support means is provided a metal heat sink of specified heat absorbing characteristics. The metal heat sink is positioned so as to be in proximity to a selected portion of an ophthalmic lens blank which is provided in the horizontal position therefor on the lens support means. During heat treatment of the ophthalmic lens blank, the proximity of the metal heat sink to the selected portion of the blank maintains that portion at a lower average temperature than the remainder of the blank. Thus the development of photochromic phases in the selected portion of the blank is retarded or suppressed and a gradient photochromic effect is provided.

Figure 1:
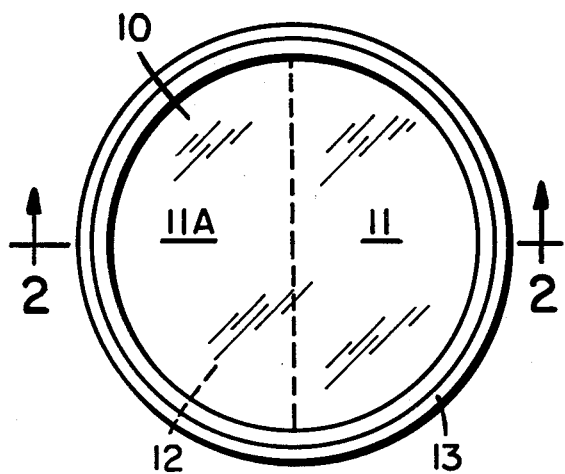
FIG. 1 of the drawing consists of a top plan view of a gradient photochromic ophthalmic lens blank and apparatus provided according to the invention. Gradient photochromic ophthalmic lens blank 10 (which has already been subjected to heat treatment) is positioned horizontally within a cylindrical former cup 13. Region 11 of lens blank 10 exhibits photochromic properties normal for photochromic glasses, whereas region 11A exhibits reduced photochromic response or is non-photochromic. The position of a metal heat sink 12 (not shown) within former cup 13, which heat sink has suppressed the development of photochromic properties in region 11A of the lens blank, is indicated.

Within former cup 13 is provided a metal heat sink 12 in proximity to lens blank 10 and particularly to selected region 11A of lens 10. A heat sink with a contoured spherically-curved top surface is shown, although other configurations such as flat-surfaced heat sinks may also be employed.

In operation, the cylindrical former cup, former, centering ring, heat sink, and a horizontally supported potentially photochromic ophthalmic lens blank are introduced into a furnace or lehr operating at a temperature sufficient to develop photochromic properties in the potentially photochromic glass. However, the heat absorbing characteristics of the metal heat sink are such that it remains at a temperature below that of the furnace or lehr for a substantial interval of time. The proximity of the relatively cool metal heat sink to region 11A of lens blank 10 slows heating of that region and retards the development of photochromic phases therein. Interruption of the heat treatment following the more rapid development of photochromic properties in normally heated region 11 of lens 10 insures that a gradient in photochromic phase development and thus photochromic properties will be preserved.

Figure 2:
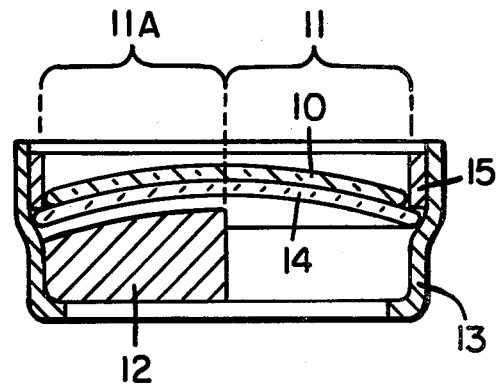
FIG. 2 is an elevational view in cross-section of the lens blank and apparatus of FIG. 1 along line 2—2 thereof. The lens support means shown consists of a cylindrical open-bottomed former cup 13 which provides edge support for a former 14 and a centering ring 15. The cup, former and centering ring support the gradient photochromic ophthalmic lens blank 10.
Figure 3A:
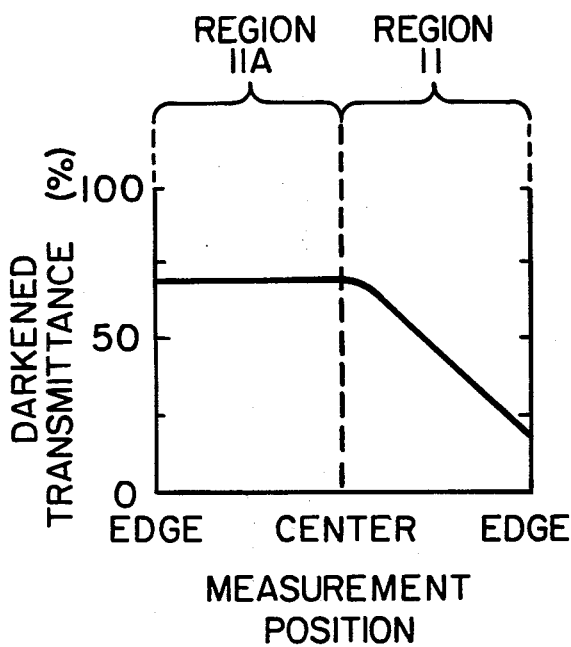
Figure 3B:
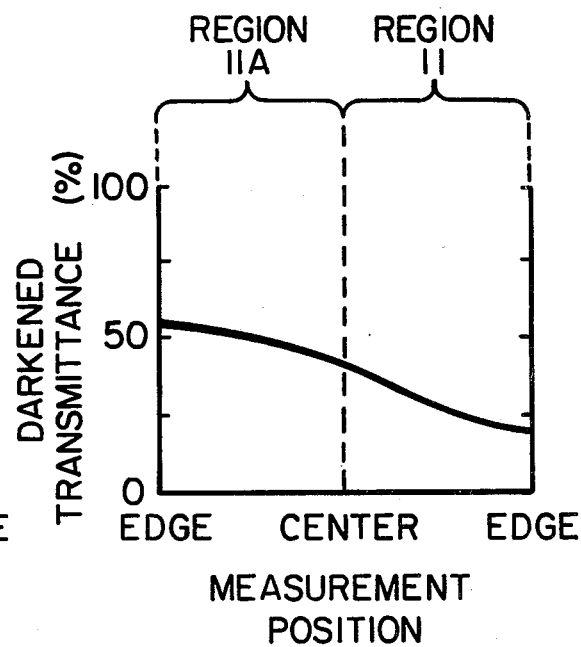

FIGS. 3a and 3b of the drawing schematically illustrate the light transmitting characteristics of two different types of gradient photochromic ophthalmic lenses. FIG. 3a is a graph of light transmittance through one type of darkened gradient lens as a function of the position of measurement on the lens. The curve of the graph is generated by plotting the series of values obtained from a number of transmittance measurements along a diameter traversing a typical lens from the non-photochromic segment (region 11A in FIGS. 1 and 2) to the photochromic segment (region 11 in FIGS. 1 and 2) in a direction perpendicular to the boundary separating the two regions. The gradient type shown in FIG. 3a, hereinafter referred to as a type B gradient, is characterized by a relatively distinct photochromic/non-photochromic boundary and good contrast between the photochromic and non-photochromic regions of the lens.

FIG. 3b is a graph generated according to the procedure used for FIG. 3a which plots a photochromic gradient hereinafter referred to as a type D gradient. This gradient type is characterized by low contrast between the lens regions due to the fact that region 11A exhibits significant photochromic darkening upon exposure to actinic radiation. This undesirable behavior is attributed to the development of photochromic phases in region 11A during heat treatment, which may be caused by excessive heat treating times and temperatures and/or a metal heat sink with an insufficient heat absorbing capacity.

DETAILED DESCRIPTION

The ophthalmic lens blank to be treated in accordance with the invention may be composed of any of the well known potentially photochromic glasses. By potentially photochromic glass is meant a glass which contains the constituents required for photochromic properties development, such as silver, one or more halogens, copper, cadmium or the like, but which has not been subjected to heat treatment to develop photochromic properties therein. Many glasses which are not photochromic as formed, but which may be rendered photochromic by a suitable heat treatment, are known.

The heat treatment utilized to convert the potentially photochromic ophthalmic lens blank to a gradient photochromic product may be the usual treatment for the particular potentially photochromic glass selected for the lens. Temperatures in the range of 400°–1000° C. and times in the range of 3 minutes – 24 hours at these temperatures may be useful for treating some of the various types of photochromic glasses which may be suitable for the fabrication of ophthalmic lenses.

Modifications to the heat treating schedule used to develop photochromic properties may of course be made to change the nature or extent of the photochromic gradient effect produced. However, it will be recognized that the heat absorbing capacity of any metallic heat sink is limited by its size and composition. Thus heat treatment at excessive temperatures and/or for excessive times will bring the heat sink and glass lens blank to thermal equilibrium, a condition which tends to erase any gradient in photochromic properties which is first produced. Of course the maximum heating temperatures and times for any particular lens blank configuration and composition are readily determined by routine experiment.

As previously noted, the metal heat sink utilized to produce a temperature gradient across the lens blank during heat treatment must have sufficient heat capacity to maintain the blank at a reduced temperature for a time sufficient to satisfactorily delay photochromic phase development in the proximate region of the blank. The use of a heat sink of insufficient cooling capacity produces an undesirable gradient exhibiting little contrast as, for example, the type D gradient shown in FIG. 3b of the drawing.

Heat capacity requirements vary somewhat depending upon glass composition and lens blank mass, due to differences in the time and temperature requirements for photochromic phase development. Thicker blanks typically require a higher capacity heat sink than do thin blanks. For presently available photochromic glasses, a heat capacity in the range of about 15-30 calories per ° C. appears to be sufficient to provide a good gradient in lens blanks of conventional diameter (65-71 mm) and thickness (3-8 mm).

Theoretically, a considerable number of metals could be used for the fabrication of a heat sink of this capacity, if a sufficient mass of the metal could be used. From a practical standpoint, however, the size of the heat sink must be limited due to considerations of effective heat transfer and available space. Thus only certain relatively high heat capacity metals are usefully adapted to the present process.

A practical measure of the suitability of a particular metal for use as a heat sink in gradient production is the volume heat capacity thereof. The volume heat capacities at room temperature of several of the more common metals which might be considered for this use are set forth in Table I below. The values are given in calories per cubic centimeter per degree C.

TABLE I

| Volume Heat Capacities (25° C.) | |
|---|---|
| Aluminum | 0.580 cal cm$^{-3}$ ° C$^{-1}$ |
| Copper | 0.824 cal cm$^{-3}$ ° C$^{-1}$ |
| Iron | 0.835 cal cm$^{-3}$ ° C$^{-1}$ |
| Zinc | 0.665 cal cm$^{-3}$ ° C$^{-1}$ |
| Tin | 0.373 cal cm$^{-3}$ ° C$^{-1}$ |
| Lead | 0.431 cal cm$^{-3}$ ° C$^{-1}$ |

In order to approach the heat capacity afforded by an equivalent volume of water-containing porous refractory support material, as used in the vapor process for producing gradient glasses, only the highest heat capacity metals should be used. Metals or alloys having volume heat capacities (at 25° C.) in excess of about 0.8 cal cm$^{-3}$ ° C.$^{-1}$, such as copper or iron, are suitable. However, heat sinks composed at least predominantly of iron are preferred for reasons of cost and effectiveness.

The invention may be further understood by reference to the detailed following examples.

EXAMPLE I

An ophthalmic lens blank about 8.0 mm in thickness and 65 in diameter, composed of a potentially photochromic glass having a composition, in parts by weight, of about 56.2 parts SiO$_2$, 8.9 parts Al$_2$O$_3$, 16.0 parts B$_2$O$_3$, 1.8 parts Na$_2$O, 2.6 parts Li$_2$O, 5.0 parts PbO, 6.6 parts BaO, 2.2 parts Zr$_2$O, 0.20 parts Ag, 0.32 parts Cl, 0.63 parts Br, 0.019 parts CuO, 0.2 parts F, 0.03 parts NiO and 0.019 parts Co$_3$O$_4$, is selected for treatment. This lens blank is positioned with a centering ring on a ceramic former and the former, centering ring and lens blank are placed in a bottomless cylindrical step ring former cup, the ceramic former being edge-supported by a circumferential step provided for that purpose in the cup wall.

A cast iron heat sink of semicircular cross-section is positioned against the circular wall of the former cup immediately beneath the ceramic former. This cast iron heat sink has a mass of about 200 grams, providing a heat capacity of about 21.2 calories per ° C. based on a specific heat (iron) of 0.106 cal gm$^{-1}$ ° C.$^{-1}$ at 25° C.

The heat sink, blank, and former cup assembly are then placed in a lehr and subjected to a heat treatment comprising exposure to a temperature of 700° C. for a time just sufficient to satisfactorily develop photochromic properties in the portion of the ophthalmic lens blank most distant from the heat sink. The blank and assembly are then cooled to room temperature and the blank is removed for examination.

Following this heat treatment, the photochromic glass blank is exposed to ultraviolet radiation for approximately 20 minutes to obtain full photochromic darkening thereof. The optical transmittance of the darkened blank is then measured near the edge most distant from the heat sink during heat treatment, and an optical transmittance value (corrected to 2 millimeter thickness) of about 18% is determined. A similar transmittance measurement taken through the edge of the blank in closest proximity to the heat sink during heat treatment provides an optical transmittance value (corrected to 2 millimeter thickness) of about 70%. This transmittance value essentially corresponds to the transmittance of the undarkened glass, indicating that the glass is substantially non-photochromic in this region. Additional transmittance measurements taken across a diameter of the darkened photochromic lens blank from the non-photochromic to the photochromic edge indicate that a type B photochromic gradient, approximating the gradient type shown in FIG. 3a of the drawing, has been provided.

EXAMPLE II

Product uniformity in the production of gradient photochromic ophthalmic lens blanks may be judged by noting shifts in the position of the gradient line dividing the photochromic and non-photochromic portions of the lens. In the case of gradual gradients of the B type hereinabove described, a convenient measure of product uniformity is the 30% transmittance point, which is that point on a line traversing the lens diameter from the non-photochromic to the photochromic edge at which the darkened transmittance of the unpolished glass (in 3 millimeter thickness) is 30%. The position of this point may vary widely if significant variations in processing time or temperature are permitted.

The uniformity of gradient photochromic ophthalmic lens blanks provided in accordance with the present invention may be compared with the uniformity of gradients produced by prior art processes on the basis of the extent of variations in position of the 30% transmittance point from the average position provided by each process. To carry out such a comparison, a number of unpolished 3.0 mm gradient photochromic ophthalmic lens blanks provided utilizing a cast iron heat sink such as described in Example I above, together with a number of gradient photochromic ophthalmic lens blanks of identical size and configuration provided by the prior art vapor cooling process, may be statistically evaluated.

The results of one such evaluation are set forth in Table II below. Included in Table II for each of the two methods employed are the number of samples evaluated, the mean position of the 30% transmittance point (in millimeters of distance from the non-photochromic edge of each sample), and the standard deviation in millimeters from the mean position exhibited by each group of samples.

TABLE II

| Process | No. of Samples | Mean Position - 30% Transmittance Point (mm.) | Std. Deviation from Mean (mm) |
|---|---|---|---|
| Iron Heat Sink Vapor | 10 | 26.2 | 2.02 |

TABLE II-continued

| Process | No. of Samples | Mean Position - 30% Transmittance Point (mm.) | Std. Deviation from Mean (mm) |
|---|---|---|---|
| Cooling | 12 | 29.6 | 2.25 |

The vapor-cooled samples evaluated in Table II were produced using porous refractory carrier materials which had been selected for freedom from excessive thermal deterioration. Higher deviations would be expected using randomly selected carriers. Thus it is believed that improved gradient uniformity characterized by reduced variations from a selected average gradient position in the lens may be provided utilizing metal heat sinks rather than vapor cooling to produce gradient photochromic lens blanks for ophthalmic use.

Of course the gradient photochromic effect obtained in each individual case will depend directly upon the composition and type of photochromic glass employed, the particular heat treating schedule utilized to develop photochromic properties in the glass, and the size, configuration, and composition of the metal heat sink which is used. Thus a wide variety useful gradient effects may be imparted to potentially photochromic glass ophthalmic lens blanks within the scope of the invention herein described.

I claim:

1. A process for manufacturing a gradient photochromic ophthalmic lens blank which comprises the steps of:
    (a) subjecting an ophthalmic lens blank composed of a potentially photochromic glass to a heat treatment at a temperature sufficient to develop photochromic properties in said glass, while
    (b) maintaining a selected portion of the ophthalmic lens blank in proximity to a solid metal heat sink having a heat capacity of at least about 15 calories $°C^{-1}$;

said metal heat sink acting to provide a temperature gradient across the ophthalmic lens blank which is effective to provide a gradient in photochromic properties thereacross.

2. A process in accordance with claim 1 wherein the metal heat sink is composed of a metal having a volume heat capacity of at least about 0.8 calories $cm^{-3} °C^{-1}$.

3. A process in accordance with claim 1 wherein the metal heat sink is composed at least predominantly of iron.

4. Lens treating apparatus for producing a gradient photochromic ophthalmic lens blank which comprises:
    (a) a cylindrical open-bottomed step-ring former cup, said former cup having a circular wall which includes a circumferential step therein;
    (b) a ceramic former positioned within the step-ring former cup and edge-supported by the circumferential step, said ceramic former being suitable for supporting a potentially photochromic ophthalmic lens blank;
    (c) a cast iron heat sink of semicircular cross-section positioned against the circular wall of the former cup and immediately beneath the ceramic former, said cast iron heat sink having a heat capacity of at least 15 calories $°C^{-1}$.

* * * * *